(12) United States Patent  (10) Patent No.: US 8,184,163 B2
Ferguson  (45) Date of Patent: May 22, 2012

(54) METHODS AND SYSTEMS FOR DETECTING AND LOCATING SKIPPED FRAMES IN A VIDEO SEQUENCE

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 665 days.

(21) Appl. No.: 12/398,725

(22) Filed: Mar. 5, 2009

(65) Prior Publication Data

US 2010/0225767 A1    Sep. 9, 2010

(51) Int. Cl.
  *H04N 17/00* (2006.01)
  *H04N 5/14* (2006.01)
(52) U.S. Cl. .......................... 348/180; 348/181; 348/700
(58) Field of Classification Search .................. 348/180, 348/181, 192, 700, 701, 722; 382/170, 181, 382/190, 224; 702/66, 71, 73, 79, 81
See application file for complete search history.

(56) References Cited

U.S. PATENT DOCUMENTS

| | | | | |
|---|---|---|---|---|
| 5,642,294 A | * | 6/1997 | Taniguchi et al. ............. | 348/700 |
| 5,835,163 A | * | 11/1998 | Liou et al. ..................... | 348/700 |
| 6,141,486 A | * | 10/2000 | Lane et al. ..................... | 386/200 |
| 6,377,297 B1 | * | 4/2002 | Janko et al. .................... | 348/180 |
| 6,906,743 B1 | * | 6/2005 | Maurer .......................... | 348/180 |
| 7,110,454 B1 | * | 9/2006 | Chakraborty ............ | 375/240.16 |
| 7,417,690 B2 | * | 8/2008 | Hori et al. ..................... | 348/700 |
| 2003/0206228 A1 | * | 11/2003 | Trevers et al. ............. | 348/14.01 |

* cited by examiner

*Primary Examiner* — Victor Kostak
(74) *Attorney, Agent, or Firm* — Kristine E. Matthews; Michael A. Nelson

(57) ABSTRACT

Embodiments of the present invention comprise methods and systems for detecting and locating skipped frames in a test video sequence in relation to a reference video sequence. Some embodiments comprise identifying pairs of temporally aligned reference and test segments. An alignment offset and freeze-frame count associated with each segment pair is received and used to calculate a number of skipped frames between a first segment pair and a second segment pair, the second segment pair being temporally subsequent to the first segment pair. In some embodiments, a number of skipped frames between the first segment pair and the second segment pair is determined by calculating a segment offset between the two segment pairs and subtracting the segment offset value from the sum of the number of freeze frames associated with the first segment pair and all temporally intervening segment pairs between the first segment pair and the second segment pair.

8 Claims, 4 Drawing Sheets

METHODS AND SYSTEMS FOR DETECTING AND LOCATING SKIPPED FRAMES IN A VIDEO SEQUENCE

FIELD OF THE INVENTION

Embodiments of the present invention relate, in general, to methods and systems for video processing, and more particularly, to methods and systems for video quality measurements and analysis.

BACKGROUND

Video quality measurements and analysis may require each frame in a test video sequence to be played at the same time as the corresponding frame of a reference video sequence is played. This may be referred to as temporal registration of the test video sequence and the reference video sequence.

Temporal registration may be difficult to perform, either manually or by an automated method, due to differing video formats, differing frame rates, temporal distortions, temporal impairments and other differences between the test video sequence and the reference video sequence. In addition, encoding, transporting, broadcasting, distributing, decoding, and other processing of video, may contribute to one, or more, frames being skipped in a video sequence as illustrated in the exemplary reference and test sequences:

```
Reference Sequence:    A B C D E F G
Test Sequence:         A B C D E G H,
``` where like-letters denote corresponding video frames, also considered frames, between the reference sequence and the test sequence. In this example, frames A, B, C, D and E are aligned. However, because of reference-video-sequence frame F being skipped in the test video sequence, the last two frames are mismatched between the test video sequence and the reference video sequence.

Automated methods and systems to measure the number and location of skipped frames in a test video sequence relative to a reference video sequence may be desirable. In particular, it may be desirable to have measurement methods and systems that are robust in the presence of digital compression artifacts, random noise, quantization error, and other non-linear and linear distortions and interferences. Additionally, it may be desirable to have measurement methods and systems that do not require a priori knowledge of the video content, aspect ratio, DUT (Device Under Test) pixel clock, frame rates, video parameters, including relative spatial mapping, for example, horizontal scaling, vertical scaling, offset and cropping, and other video factors. Accurate and computationally efficient methods and systems may also be desirable.

SUMMARY

Embodiments of the present invention comprise methods and systems for detecting and locating skipped frames in a test video sequence in relation to a reference video sequence. Some embodiments of the present invention comprise identifying pairs of temporally aligned reference segments and test segments. An alignment offset and freeze-frame count associated with each segment pair may be received and used to calculate a number of skipped frames between a first segment pair and a second segment pair, wherein the second segment pair is temporally subsequent to the first segment pair. In some embodiments of the present invention, a number of skipped frames between the first segment pair and the second segment pair may be determined by calculating a segment offset between the two segment pairs and subtracting the segment offset value from the sum of the number of freeze frames associated with the first segment pair and all temporally intervening segment pairs between the first segment pair and the second segment pair.

Some embodiments of the present invention comprise calculating a similarity measure between corresponding frames in segment pairs and identifying discontinuities in the calculated similarity measures. In these embodiments, the location of skipped frames may be determined by resolving the discontinuities using the skipped-frame and freeze-frame counts associated with the segment pairs.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION

Figure 1:
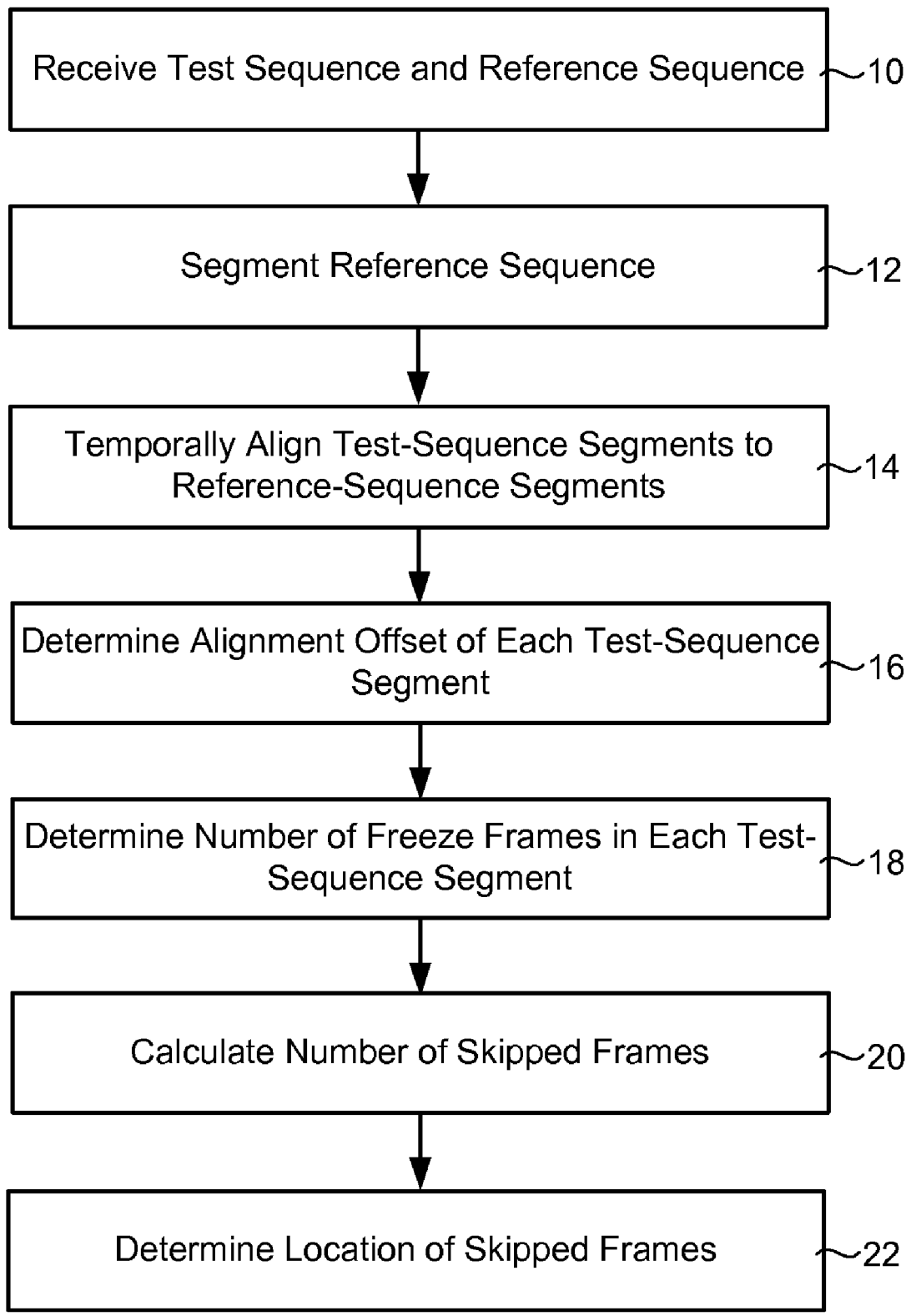
FIG. 1 is a chart showing exemplary embodiments of the present invention comprising forming temporally aligned segment pairs and calculating the number of skipped frames using alignment offset and freeze-frame count.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of embodiments of the invention.

Embodiments of the present invention may be implemented within a test and measurement instrument. For example, embodiments of the present invention may be implemented in a video test instrument, such as a picture quality analyzer. Picture quality analyzers such as the TEKTRONIX® PQA500 may incorporate embodiments of the present invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention may be used to process signals originating from video equipment. These video signals might be produced by playback equipment, such as DVD players, set-top boxes or production equipment used by broadcasters, or other content providers, prior to transmission of content to end-users.

Video quality measurements and analysis may require each frame in a test video sequence to be played at the same time as the corresponding frame of a reference video sequence is played. This may be referred to as temporal registration of the test video sequence and the reference video sequence.

Temporal registration may be difficult to perform, either manually or by an automated method, due to differing video formats, differing frame rates, temporal distortions, temporal impairments and other differences between the test video sequence and the reference video sequence. In addition, encoding, transporting, broadcasting, distributing, decoding, and other processing of video, may contribute to one, or more, frames being skipped in a video sequence as illustrated in the exemplary reference and test sequences:

```
Reference Sequence:      A B C D E F G
Test Sequence:           A B C D E G H,
``` where like-letters denote corresponding video frames between the reference sequence and the test sequence. In this example, frames A, B, C, D and E are aligned. However, because of reference-video-sequence frame F being skipped in the test video sequence, the last two frames are mismatched between the test video sequence and the reference video sequence.

Automated methods and systems to measure the number and location of skipped frames in a test video sequence relative to a reference video sequence may be desirable. In particular, it may be desirable to have measurement methods and systems that are robust in the presence of digital compression artifacts, random noise, quantization error, and other non-linear and linear distortions and interferences. Additionally, it may be desirable to have measurement methods and systems that do not require a priori knowledge of the video content, aspect ratio, DUT (Device Under Test) pixel clock, frame rates, video parameters, including relative spatial mapping, for example, horizontal scaling, vertical scaling, offset and cropping, and other video factors. Accurate and computationally efficient methods and systems may also be desirable.

Embodiments of the present invention comprise methods and system for detecting and locating skipped frames in a test video sequence, also considered a test sequence, relative to a reference video sequence, also considered a reference sequence.

Some embodiments of the present invention may be described in relation to FIG. 1. In these embodiments, a test sequence and a reference sequence may be received 10. The reference sequence may be segmented 12, and test-sequence segments may be temporally aligned 14 to the reference-sequence segments, thereby producing pairs of temporally aligned segments. An alignment offset associated with each test-sequence segment may be determined 16. A test-sequence segment alignment offset may be the offset in the test sequence relative to the reference sequence of the starting frame of the reference-sequence segment and the starting frame of the test-sequence segment in a segment pair. The number of freeze frames in each test-sequence segment may be determined 18. The number of skipped frames, which may be denoted SkippedFramesBetween(•,•), between, at least, the middle of a first segment pair, which may be denoted si, and, at least, the middle of a second segment pair, which may be denoted sj, may be calculated 20 using the offset values and the number of freeze frames according to:

$$SkippedFramesBetween(si, sj) = \sum_{s=si}^{sj-1} FreezeFrames(s) + alignOS(si) - alignOS(sj),$$

where FreezeFrames(s) may denote the number of freeze frames in the test-sequence segment of segment pair s and alignOS(s) may denote the alignment offset of the test-sequence segment in segment pair s. The location of the skipped frames may be determined 22 based on the number of skipped frames detected between pairs of segments. In some embodiments of the present invention, an incorrect skipped-frame count may be determined when a skipped frame occurs substantially close to the beginning of the first segment or substantially close to the end of the last segment. These outcomes may be referred to as end-point-based inconsistent results. In some embodiments of the present invention, a skipped frame that is not detected between two segment pairs may be detected between two other segment pairs.

Calculation 20 of the number of skipped frames may be understood in relation to the following example. In this illustrative example, a reference sequence comprising a sequence of reference frames and a test sequence comprising a sequence of test frames may be denoted:

```
A B C D E F G H I J K L M N O P Q R S T U V W X Y
Z a b c d e f g h i j k l m
and
A B C D E F I J K L M N N O P R S T U V W X Y Z a
b c d d e f g h i j k l m,
``` respectively, wherein frames G, H and Q are skipped in the test sequence in relation to the reference sequence, and frames N and d in the test sequence are freeze frames with freeze-frame occurrences of one and two, respectively. Exemplary segment alignments may be given by the segment pairs:

```
Segment pair 0:   s = 0
                  Reference-sequence A B C D E F G H
                  segment:
                  Test-sequence      A B C D E F I J
                  segment:
FreezeFrames (0) = 0 and alignOS (0) = 0

Segment pair 1:   s = 1
                  Reference-sequence I J K L M N O P
                  segment:
                  Test-sequence      I J K L M N N O
                  segment:
```

```
-continued
FreezeFrames (1) = 1 and alignOS (1) = -2

Segment pair 2:  s = 2
                 Reference-sequence Q R S T U V W X
                 segment:
                 Test-sequence        P R S T U V W X
                 segment:
FreezeFrames (2) = 0 and alignOS (2) = -2

Segment pair 3:  s = 3
                 Reference-sequence Y Z a b c d e f
                 segment:
                 Test-sequence        Y Z a b c d d
                 segment:
FreezeFrames (3) = 2 and alignOS (3) = -2

Segment pair 4:  s = 4
                 Reference-sequence g h i j k l m
                 segment:
                 Test-sequence        g h i j k l m
                 segment:
FreezeFrames (4) = 0 and alignOS (4) = 0.
```

The number of freeze frames and alignment offsets may be used to calculate the number of skipped frames between segment pairs. The number of freeze frames and alignment information is summarized in Table 1 for this example.

TABLE 1

Segment Summary for Example

| SEGMENT s | ALIGNMENT OFFSET alignOS(s) | NUMBER OF FREEZE FRAMES FreezeFrames(s) |
|---|---|---|
| 0 | 0 | 0 |
| 1 | -2 | 1 |
| 2 | -2 | 0 |
| 3 | -2 | 2 |
| 4 | 0 | 0 |

The number of skipped frames between, at least, the middle of Segment pair 0 and, at least, the middle of Segment pair 1 may be calculated according to:

$$SkippedFramesBetween(0, 1) = \sum_{s=0}^{0} FreezeFrames(s) + alignOS(0) - alignOS(1)$$

$$SkippedFramesBetween(0, 1) = 0 + 0 - (-2) = 2.$$

Thus, the number of skipped frames is determined to be two, which is consistent since reference frames G and H are skipped in the test segment.

The number of skipped frames between, at least, the middle of Segment pair 0 and, at least, the middle of Segment pair 2 may be calculated according to:

$$SkippedFramesBetween(0, 2) = \sum_{s=0}^{1} FreezeFrames(s) + alignOS(0) - alignOS(2)$$

$$SkippedFramesBetween(0, 2) = (0 + 1) + 0 - (-2) = 3.$$

Thus, the number of skipped frames is determined to be three, which is consistent since reference frames G, H and Q are skipped in the test segment.

The number of skipped frames between, at least, the middle of Segment pair 0 and, at least, the middle of Segment pair 3 may be calculated according to:

$$SkippedFramesBetween(0, 3) = \sum_{s=0}^{2} FreezeFrames(s) + alignOS(0) - alignOS(3)$$

$$SkippedFramesBetween(0, 3) = (0 + 1 + 0) + 0 - (-2) = 3.$$

Thus, the number of skipped frames is determined to be three, which is consistent since reference frames G, H and Q are skipped in the test segments.

The number of skipped frames between, at least, the middle of Segment pair 0 and, at least, the middle of Segment pair 4 may be calculated according to:

$$SkippedFramesBetween(0, 4) = \sum_{s=0}^{3} FreezeFrames(s) + alignOS(0) - alignOS(4)$$

$$SkippedFramesBetween(0, 4) = (0 + 1 + 0 + 2) + 0 - 0 = 3.$$

Thus, the number of skipped frames is determined to be three, which is consistent since reference frames G, H and Q are skipped in the test segments.

The number of skipped frames between, at least, the middle of Segment pair 1 and, at least, the middle of Segment pair 2 may be calculated according to:

$$SkippedFramesBetween(1, 2) = \sum_{s=1}^{1} FreezeFrames(s) + alignOS(1) - alignOS(2)$$

$$SkippedFramesBetween(1, 2) = 1 + (-2) - (-2) = 1.$$

Thus, the number of skipped frames is determined to be one, which is consistent since reference frame Q is skipped in the test segment.

The number of skipped frames between, at least, the middle of Segment pair 1 and, at least, the middle of Segment pair 3 may be calculated according to:

$$SkippedFramesBetween(1, 3) = \sum_{s=1}^{2} FreezeFrames(s) + alignOS(1) - alignOS(3)$$

$$SkippedFramesBetween(1, 3) = (1 + 0) + (-2) - (-2) = 1.$$

Thus, the number of skipped frames is determined to be one, which is consistent since reference frame Q is skipped in the test segments.

The number of skipped frames between, at least, the middle of Segment pair 1 and, at least, the middle of Segment pair 4 may be calculated according to:

$$SkippedFramesBetween(1, 4) =$$

$$\sum_{s=1}^{3} FreezeFrames(s) + alignOS(1) - alignOS(4)$$

$$SkippedFramesBetween(1, 4) = (1 + 0 + 2) + (-2) - (0) = 1.$$

Thus, the number of skipped frames is determined to be one, which is consistent since reference frame Q is skipped in the test segments.

The number of skipped frames between, at least, the middle of Segment pair 2 and, at least, the middle of Segment pair 3 may be calculated according to:

$$SkippedFramesBetween(2, 3) =$$

$$\sum_{s=2}^{2} FreezeFrames(s) + alignOS(2) - alignOS(3)$$

$$SkippedFramesBetween(2, 3) = (0) + (-2) - (-2) = 0.$$

Thus, the number of skipped frames is determined to be zero, which is inconsistent due to end-point conditions.

The number of skipped frames between, at least, the middle of Segment pair 2 and, at least, the middle of Segment pair 4 may be calculated according to:

$$SkippedFramesBetween(2, 4) =$$

$$\sum_{s=2}^{3} FreezeFrames(s) + alignOS(2) - alignOS(4)$$

$$SkippedFramesBetween(2, 4) = (0 + 2) + (-2) - (0) = 0.$$

Thus, the number of skipped frames is determined to be zero, which is inconsistent due to end-point conditions.

The number of skipped frames between, at least, the middle of Segment pair 3 and, at least, the middle of Segment pair 4 may be calculated according to:

$$SkippedFramesBetween(3, 4) =$$

$$\sum_{s=3}^{3} FreezeFrames(s) + alignOS(3) - alignOS(4)$$

$$SkippedFramesBetween(3, 4) = (2) + (-2) - (0) = 0.$$

Thus, the number of skipped frames is determined to be zero, which is consistent since no frames are skipped in the test segment.

In some embodiments of the present invention, temporal alignment 14, offset determination 16 and freeze-frame determination 18 for each segment pair may be performed according to methods and systems developed by Kevin M. Ferguson, the present inventor, and described in U.S. patent application Ser. No. 12/104,380, hereinafter the '380 application, entitled "Systems and Methods for Robust Video Temporal Registration," filed on Apr. 16, 2008, and which is hereby incorporated herein by reference in its entirety. The '380 application claims the benefit of U.S. Provisional Patent Application Ser. No. 60/912,167 entitled "Systems and Methods for Robust Video Temporal Registration," filed on Apr. 16, 2007, and which is hereby incorporated herein by reference in its entirety. In these embodiments, the methods and systems of the '380 application may be applied successively using each segment result to initialize the next search.

In alternative embodiments of the present invention, temporal alignment 14, offset determination 16 and freeze-frame determination 18 may be performed according to alternative methods. Exemplary alternative methods may include manual methods, automated methods and other methods known in the art.

Figure 2:
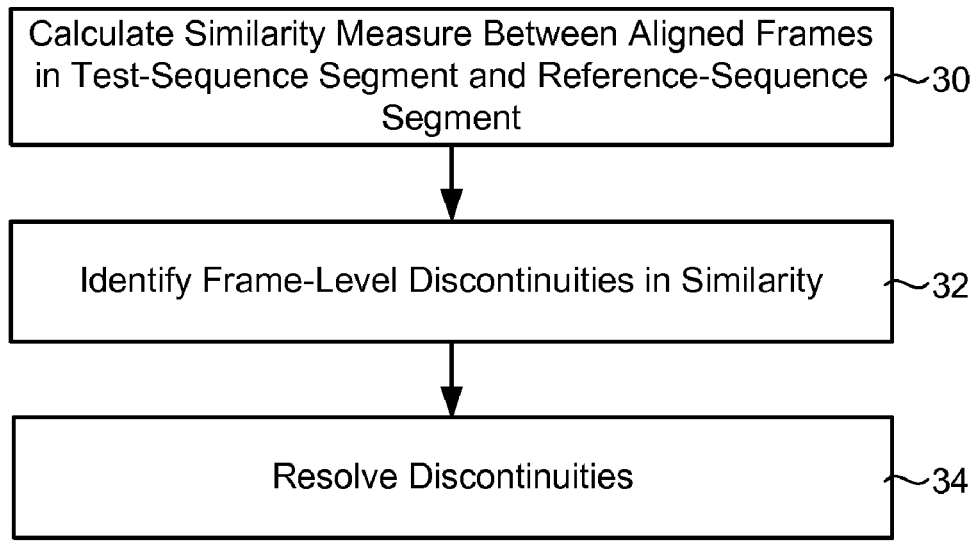
FIG. 2 is a chart showing exemplary embodiments of the present invention comprising similarity-measure calculation, similarity-measure discontinuity identification and discontinuity resolution for locating skipped frames.

In some embodiments of the present invention described in relation to FIG. 1 and FIG. 2, determining 22 the location of skipped frames within one, or more, pairs of segments may comprise measuring 30 the similarity between reference-sequence frames and test-sequence frames in the segment pairs. Exemplary similarity measures may comprise calculating peak-signal-to-noise ratio (PSNR), a correlation or other measures of similarity known in the art. Frame-level discontinuities in similarity may be identified 32 and resolved 34 to locate the skipped frames.

Figure 3:
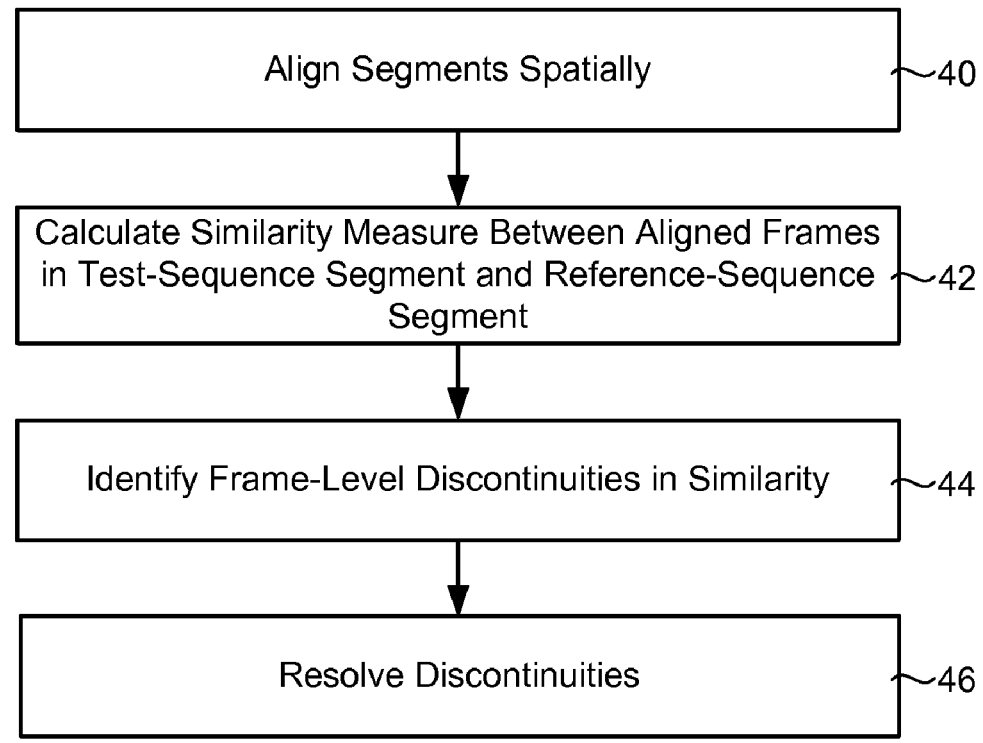
FIG. 3 is a chart showing exemplary embodiments of the present invention comprising spatial alignment prior to similarity-measure calculation.

In some embodiments of the present invention described in relation to FIG. 1 and FIG. 3, determining 22 the location of skipped frames may comprise spatial alignment 40 prior to similarity calculation 42, discontinuity identification 44 and discontinuity resolution 46. In some embodiments of the present invention, spatial alignment 40 may be performed according to methods and systems developed by Kevin M. Ferguson, the present inventor, and described in U.S. patent application Ser. No. 11/944,050, hereinafter the '050 application, entitled "Measurement Apparatus and Method of Measurement of Video Spatial Scale, Offset and Cropping," filed on Nov. 21, 2007, and which is hereby incorporated herein by reference in its entirety. The '050 application claims the benefit of U.S. Provisional Patent Application Ser. No. 60/867,087, filed on Nov. 22, 2006, and which is hereby incorporated herein by reference in its entirety.

In some embodiments of the present invention, discontinuity resolution 34, 46 may comprise alignment compensation for freeze frames.

In some embodiments of the present invention, multiple skipped frames per segment pair may be located by alignment adjustment of the segments within the segment pair to favor the portion with the poorest alignment at a previously determined skipped-frame discontinuity and successively locating, according to the above-described embodiments, additional skipped frames.

Figure 4:
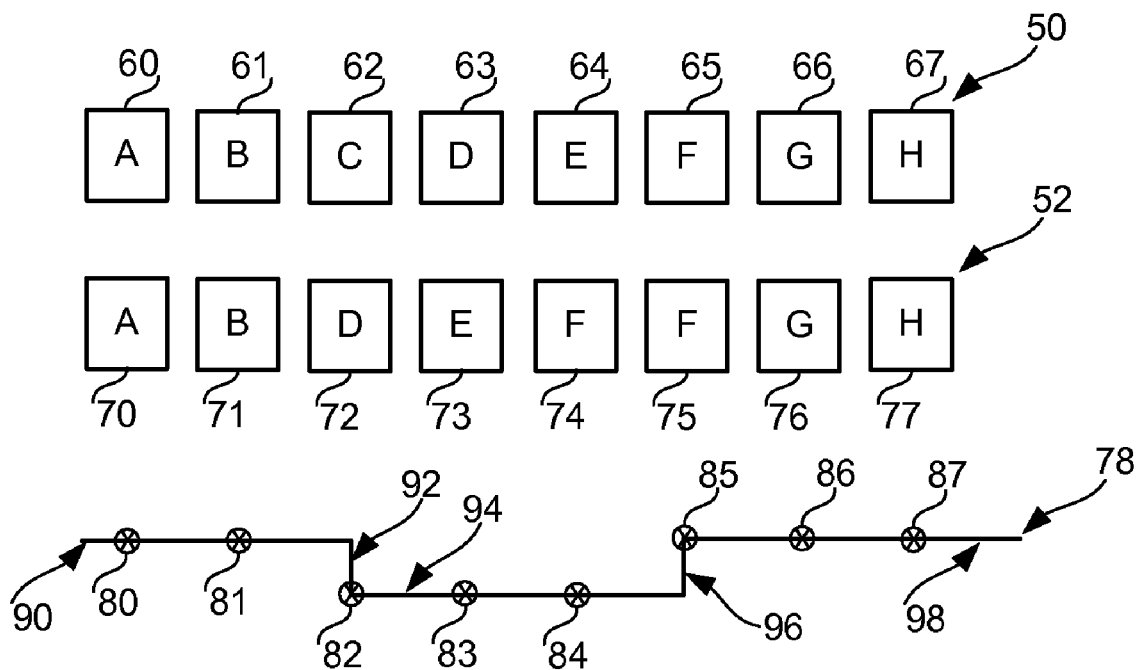
FIG. 4 is a picture illustrating similarity-measure discontinuity resolution, for an exemplary reference segment and test segment, according to embodiments of the present invention.
Figure 5:
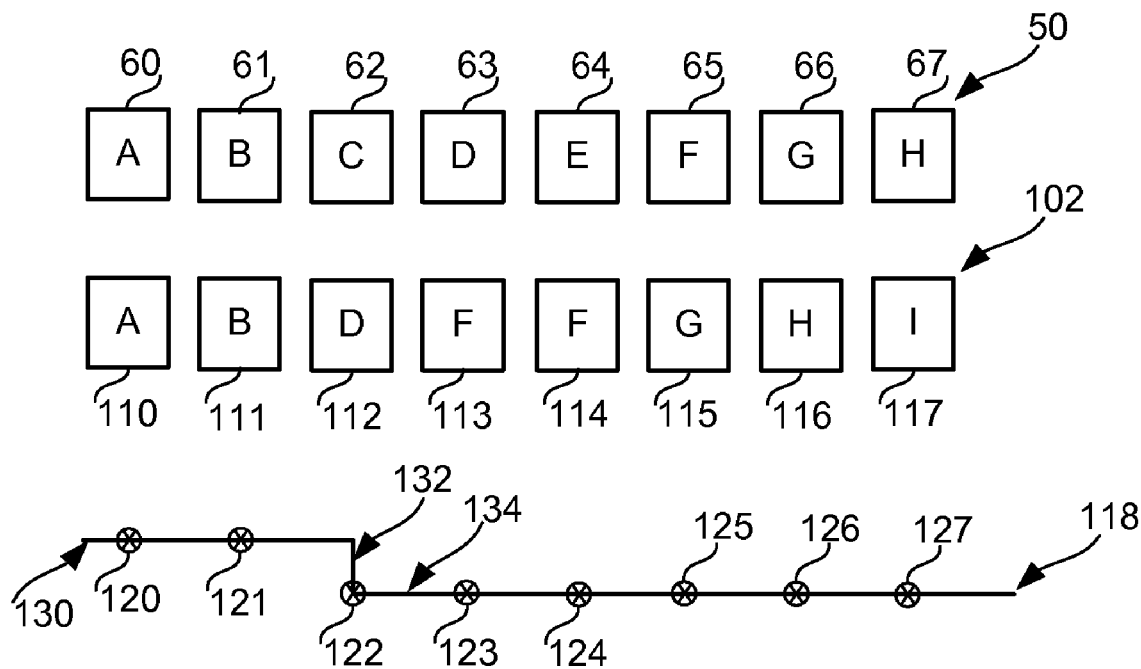
FIG. 5 is a picture illustrating similarity-measure discontinuity resolution, for an exemplary reference segment and test segment, according to embodiments of the present invention.
Figure 6:
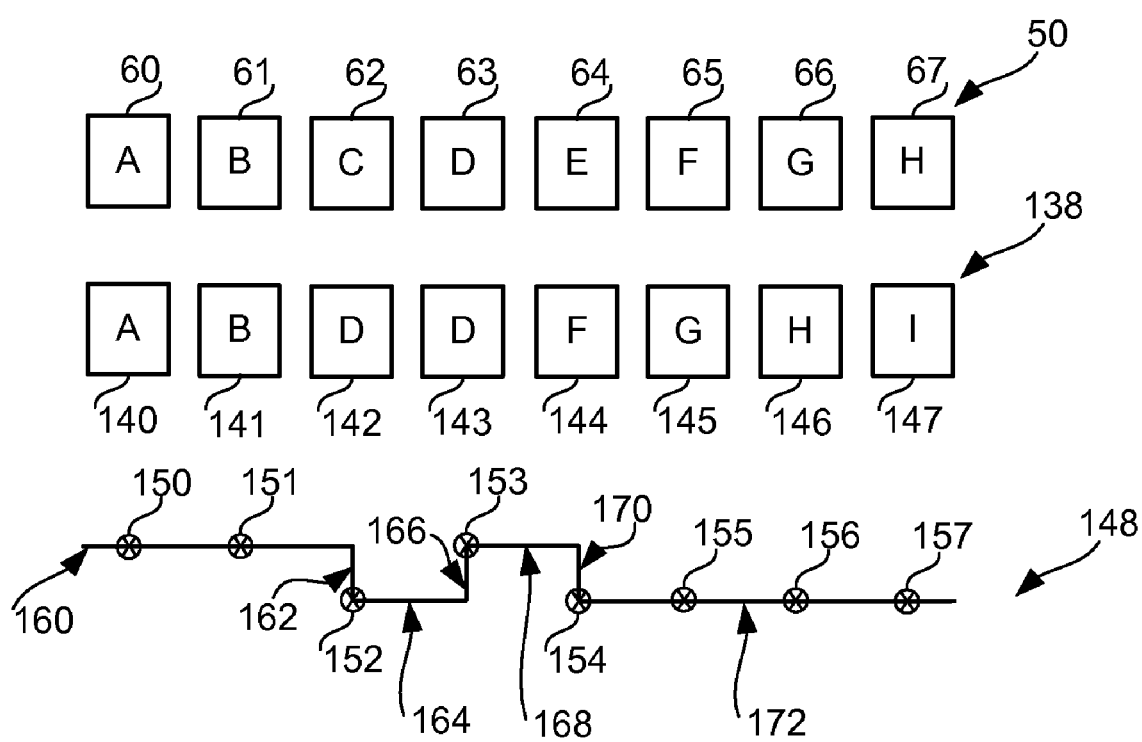
FIG. 6 is a picture illustrating similarity-measure discontinuity resolution, for an exemplary reference segment and test segment, according to embodiments of the present invention.

Discontinuity resolution according to some embodiments of the present invention may be understood in relation to the following examples depicted in FIG. 4, FIG. 5 and FIG. 6.

FIG. 4 depicts an exemplary reference segment 50 and an exemplary test segment 52. The exemplary reference segment 50 comprises eight frames 60-67 labeled A, B, C, D, E, F, G and H, respectively, and the exemplary test segment 52 comprises eight frames 70-77, wherein, relative to the reference segment 50, frame C has been skipped and segment F 74, 75 appears twice. The freeze-frame count for this exemplary segment pair is one, and the skipped-frame count is one. An exemplary similarity plot 78 is shown, wherein similar frames yield high 90, 98 similarity-measure values, and dissimilar frames yield low 94 similarity-measure values. Discontinuities 92, 96 occur at the transitions between high and low similarity-measure values. Thus, in this example: reference frame A 60 and test frame A 70 are aligned and yield a high similarity-measure value 80; reference frame B 61 and test frame B 71 are aligned and yield a high similarity-measure value 81; reference frame C 62 and test frame D 72 are not aligned and yield a low similarity-measure value 82; reference frame D 63 and test frame E 73 are not aligned and yield a low similarity-measure value 83; reference frame E 64 and test frame F 74 are not aligned and yield a low similarity-measure value 84; reference frame F 65 and test frame (freeze frame) F 75 are aligned and yield a high similarity-measure value 85; reference frame G 66 and test frame G 76 are aligned and yield a high similarity-measure value 86; and reference frame H 67 and test frame H 77 are aligned and yield a high similarity-measure value 87. Since frame C is missing in the test segment 52 relative to the reference segment 50, a discontinuity 92 occurs at the location of frame C in the reference segment 50, and thus the location of the skipped frame is known. The similarity measure stays at a low value 94 until the freeze frame brings the segments back into alignment, wherein another discontinuity 96 in the plot of the similarity measure occurs.

FIG. 5 depicts an exemplary reference segment 50 and an exemplary test segment 102. The exemplary reference segment 50 comprises eight frames 60-67 labeled A, B, C, D, E, F, G and H, respectively, and the exemplary test segment 102 comprises eight frames 110-117, wherein, relative to the reference segment 50, frames C and E have been skipped and segment F 113, 114 appears twice. The freeze-frame count for this exemplary segment pair is one, and the skipped-frame count is two. An exemplary similarity plot 118 is shown, wherein similar frames yield high 130 similarity-measure values, and dissimilar frames yield low 134 similarity-measure values. A discontinuity 132 occurs at the transition between the high and the low similarity-measure values. Thus, in this example: reference frame A 60 and test frame A 110 are aligned and yield a high similarity-measure value 120; reference frame B 61 and test frame B 111 are aligned and yield a high similarity-measure value 121; reference frame C 62 and test frame D 112 are not aligned and yield a low similarity-measure value 122; reference frame D 63 and test frame F 113 are not aligned and yield a low similarity-measure value 123; reference frame E 64 and test frame (freeze frame) F 114 are not aligned and yield a low similarity-measure value 124; reference frame F 65 and test frame G 115 are not aligned and yield a low similarity-measure value 125; reference frame G 66 and test frame H 116 are not aligned and yield a low similarity-measure value 126; and reference frame H 67 and test frame I 117 are not aligned and yield a low similarity-measure value 87. Since frame C is missing in the test segment 102 relative to the reference segment 50, a discontinuity 132 occurs at the location of frame C in the reference segment 50, and thus the location of the skipped frame is known. The similarity measure stays at a low value 134 even past the freeze frame, thereby indicating the location of the second skipped frame.

FIG. 6 depicts an exemplary reference segment 50 and an exemplary test segment 138. The exemplary reference segment 50 comprises eight frames 60-67 labeled A, B, C, D, E, F, G and H, respectively, and the exemplary test segment 138 comprises eight frames 140-147, wherein, relative to the reference segment 50, frames C and E have been skipped and segment D 142, 143 appears twice. The freeze-frame count for this exemplary segment pair is one, and the skipped-frame count is two. An exemplary similarity plot 148 is shown, wherein similar frames yield high 160, 168 similarity-measure values, and dissimilar frames yield low 164, 172 similarity-measure values. Discontinuities 162, 166, 170 occur at the transitions between high and low similarity-measure values. Thus, in this example: reference frame A 60 and test frame A 140 are aligned and yield a high similarity-measure value 150; reference frame B 61 and test frame B 141 are aligned and yield a high similarity-measure value 151; reference frame C 62 and test frame D 142 are not aligned and yield a low similarity-measure value 152; reference frame D 63 and test frame (freeze frame) D 143 are aligned and yield a high similarity-measure value 153; reference frame E 64 and test frame F 144 are not aligned and yield a low similarity-measure value 154; reference frame F 65 and test frame G 145 are not aligned and yield a low similarity-measure value 155; reference frame G 66 and test frame H 146 are not aligned and yield a low similarity-measure value 156; and reference frame H 67 and test frame I 147 are not aligned and yield a low similarity-measure value 157. Since frame C is missing in the test segment 138 relative to the reference segment 50, a discontinuity 162 occurs at the location of frame C in the reference segment 50, and thus the location of a first skipped frame is known. The similarity measure jumps 166 from a low value 164 to a high value 168 when the freeze frame brings the segments back into alignment. A subsequent discontinuity 170 indicates a second skipped frame since the freeze frame corresponding to the freeze-frame count of one has already been consumed in the discontinuity resolution. Thus, the two skipped frames and one freeze frame have been resolved.

The above-described examples are intended to illustrate discontinuity resolution, and are not intended to be considered an exhaustive description of rules for discontinuity resolution.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for detecting skipped frames between a test video sequence and a reference video sequence, said method comprising:

a) identifying a first plurality of segment pairs associated with a test video sequence comprising a plurality of test frames and a reference video sequence comprising a plurality of reference frames, wherein each segment pair in the first plurality of segment pairs comprises a portion of the reference frames and a temporally aligned portion of the test frames;

b) for each segment pair in the first plurality of segment pairs, receiving an associated alignment offset and an associated freeze-frame count;

c) calculating a segment alignment offset between a first segment pair in the first plurality of segment pairs and a second segment pair in the first plurality of segment pairs, wherein the second segment pair is temporally subsequent to the first segment pair;

d) for the first segment pair and each segment pair in a second plurality of segment pairs comprising any segment pair in the first plurality of segment pairs temporally intervening between the first segment pair and the second segment pair, summing the associated freeze-frame counts; and e) subtracting the segment alignment offset from the summed freeze-frame count to form a skipped-frame count associated with the first segment pair and the second segment pair.

2. The method as described in claim 1 further comprising:

a) for the first segment pair, calculating a similarity measure between corresponding frames in the first-segment-pair reference frames and the first-segment-pair temporally aligned test frames, thereby producing a first plurality of similarity measures;

b) for each segment pair in the second plurality of segment pairs, calculating a similarity measure between corresponding frames in the segment-pair reference frames and the segment-pair temporally aligned test frames, thereby producing a second plurality of similarity measures;

c) identifying discontinuities in said first plurality of similarity measures and said second plurality of similarity measures; and d) resolving said identified discontinuities using the skipped-frame count.

3. The method as described in claim 2 further comprising spatially aligning corresponding frames in the first-segment-pair reference frames and the first-segment-pair temporally aligned test frames.

4. The method as described in claim 2, wherein the calculating a similarity measure between corresponding frames in the first-segment-pair reference frames and the first-segment-pair temporally aligned test frames comprises calculating a measure selected from the group consisting of an error measure and a correlation measure.

5. The method as described in claim 1, wherein the identifying a first plurality of segment pairs comprises:

a) distilling each test frame in the plurality of test frames and each reference frame in the plurality of reference frames into frame distillation measurements;

b) from the frame distillation measurements, performing a linear alignment measurement using a linear Hough transform of a local Pearson's cross-correlation coefficient (LPCCC) image for spatial alignment of the frames between the test and reference video sequences to find a best fit line through the LPCCC image; and c) for each pixel of the LPCCC image along the best fit line, searching vertically for a higher correlation coefficient when the pixel has a value less than a threshold to find a better frame match for temporal alignment of the frames between the test and reference video sequences.

6. The method as described in claim 5, wherein the frame distillation measurements comprise summaries of mean, standard deviation and root-mean-square (RMS) differences between corresponding frames of the test video sequence and the reference video sequence.

7. The method as described in claim 5, wherein the frame distillation measurements comprise summaries of mean, standard deviation and root-mean-square (RMS) differences between sub-images for each pair of corresponding frames of the test video sequence and the reference video sequence.

8. The method as described in claim 5, wherein the frame distillation measurements comprise summary line and summary column one-dimensional images of the LPCCC image.

* * * * *